(12) United States Patent
Ahmed et al.

(10) Patent No.: US 12,339,917 B2
(45) Date of Patent: Jun. 24, 2025

(54) METHOD AND SYSTEM FOR GENERATING USER ROLE-SPECIFIC RESPONSES THROUGH LARGE LANGUAGE MODELS

(71) Applicant: INFOSYS LIMITED, Bangalore (IN)

(72) Inventors: Syed Ahmed, Bangalore (IN); Ritarshi Chakraborty, Bangalore (IN)

(73) Assignee: Infosys Limited, Bangalore (IN)

(*) Notice: Subject to any disclaimer, the term of this patent is extended or adjusted under 35 U.S.C. 154(b) by 0 days.

(21) Appl. No.: 18/586,042

(22) Filed: Feb. 23, 2024

(65) Prior Publication Data

US 2025/0077595 A1 Mar. 6, 2025

(30) Foreign Application Priority Data

Sep. 6, 2023 (IN) .............................. 202341060054

(51) Int. Cl.
*G06F 16/9535* (2019.01)
*G06F 16/9538* (2019.01)

(52) U.S. Cl.
CPC ...... *G06F 16/9535* (2019.01); *G06F 16/9538* (2019.01)

(58) Field of Classification Search
CPC ........... G06F 16/2455; G06F 16/24575; G06F 16/3329; G06F 16/3347; G06F 16/335; G06F 16/338; G06F 16/435; G06F 16/907; G06F 16/908; G06F 16/909; G06F 16/951; G06F 16/9535; G06F 16/9536; G06F 16/9538; G06F 2221/2141; G06F 21/604; G06F 21/6218; G06F 21/6245; G06F 40/00; G06F 40/284; G06F 40/295; G06F 40/30; G06N 20/00; G06N 20/10; G06N 3/0475; G06N 3/08

See application file for complete search history.

(56) References Cited

U.S. PATENT DOCUMENTS

| | | | |
|---|---|---|---|
| 8,166,071 B1* | 4/2012 | Korablev | G06F 21/604 707/783 |
| 8,862,597 B2* | 10/2014 | Barak | G06F 16/9536 707/754 |
| 12,039,263 B1* | 7/2024 | Mondlock | G06F 40/20 |
| 12,105,729 B1* | 10/2024 | Haq | G06F 16/338 |
| 2022/0083603 A1* | 3/2022 | Sisto | G06V 30/153 |
| 2023/0062307 A1* | 3/2023 | Ramsl | G06F 16/166 |
| 2023/0350929 A1* | 11/2023 | Hasan | G06N 5/022 |
| 2024/0146734 A1* | 5/2024 | Southgate | G06F 21/6227 |

(Continued)

*Primary Examiner* — Robert W Beausoliel, Jr.
*Assistant Examiner* — Cheryl M Shechtman
(74) *Attorney, Agent, or Firm* — Finnegan, Henderson, Farabow, Garrett & Dunner LLP

(57) ABSTRACT

This disclosure relates to method and system for generating user role-specific responses through Large Language Models (LLMs). The method includes receiving a user query from a user account. The user account is associated with a user role from a plurality of user roles. The method includes combining, based on the user role, the user query with contextual information corresponding to the user query to obtain a combined query. The method includes inputting the combined query to an LLM. The method includes generating a user role-specific response corresponding to the combined query through the LLM. The method includes rendering the user role-specific response to a display of a user device associated with the user account.

18 Claims, 6 Drawing Sheets

(56) References Cited

U.S. PATENT DOCUMENTS

| | | | |
|---|---|---|---|
| 2024/0184834 A1* | 6/2024 | McCann | G06F 16/9532 |
| 2024/0311468 A1* | 9/2024 | Mishina | G06F 21/52 |
| 2024/0346256 A1* | 10/2024 | Qin | G06F 40/216 |
| 2025/0013773 A1* | 1/2025 | Kamyshenko | G06F 21/6227 |

* cited by examiner

METHOD AND SYSTEM FOR GENERATING USER ROLE-SPECIFIC RESPONSES THROUGH LARGE LANGUAGE MODELS

CROSS REFERENCE TO THE RELATED APPLICATION

This patent application refers to, claims priority to, and claims the benefit of Indian provisional application No. 20/234,1060054, filed on Sep. 6, 2023. The above-referenced application is hereby incorporated herein by reference in its entirety.

TECHNICAL FIELD

This disclosure relates generally to Large Language Models (LLMs), and more particularly to method and system for generating user role-specific responses through LLMs.

BACKGROUND

Large Language Models (LLMs) are Artificial Intelligence (AI) models that are highly capable of interacting with users in natural language. LLMs have proven to be a reliable alternative to general web search for many internet users. However, in current scenario, LLMs generate similar responses to similar queries provided by two or more users, even when requirements of the users are different.

Today, LLM-based applications (such as, chatbots) are being used in various enterprises for addressing employee concerns, answering Frequently Asked Questions (FAQs), troubleshooting different issues, etc. However, irrespective of role or rank of a user in an enterprise, conventional LLMs may provide similar responses to similar user queries. This technique of generating similar responses, without considering the requirements of the user accessing the LLM, may lead to generation of irrelevant results for some of the users.

In the present state of art, there is no mechanism to modify an LLM response according to the user providing the user query. For example, there are two roles in a corporate enterprise-one of a line engineer and other of a senior executive. A generative AI-based chatbot assistant is used in the enterprise that helps employees of the enterprise in various aspects. If both the users ask the question "What is the company policy for travel reimbursements?", both the users obtain similar and generic responses. Similarly for other questions, a level of detail and a kind of response required may vary on the user role of an employee of the enterprise, seniority level, and access privileges of the employee. For some user queries, senior executives may need only a high-level response, while a person working in a relevant function may need more detailed response. In such scenarios, conventional techniques may generate data with insufficient information which is mandatorily required by a particular user or may generate excess information which may not be of any use for another user.

Therefore, there is a need for a solution that improves the technique of generating responses to the queries.

SUMMARY

In one embodiment, a method for generating user role-specific responses through Large Language Models (LLMs) is disclosed. In one example, the method may include receiving a user query from a user account. The user account may be associated with a user role from a plurality of user roles. The method may further include combining, based on the user role and by the computing device, the user query with contextual information corresponding to the user query to obtain a combined query. The method may further include inputting the combined query to an LLM. The method may further include generating a user role-specific response corresponding to the combined query through the LLM. The method may further include rendering the user role-specific response to a display of a user device associated with the user account.

In one embodiment, a system for generating user role-specific responses through Large Language Models (LLMs) is disclosed. In one example, the system may include a processor and a computer-readable medium communicatively coupled to the processor. The computer-readable medium may store processor-executable instructions, which, on execution, may cause the processor to receive a user query from a user account. The user account may be associated with a user role from a plurality of user roles. The processor-executable instructions, on execution, may further cause the processor to combine, based on the user role, the user query with contextual information corresponding to the user query to obtain a combined query. The processor-executable instructions, on execution, may further cause the processor to input the combined query to an LLM. The processor-executable instructions, on execution, may further cause the processor to generate a user role-specific response corresponding to the combined query through the LLM. The processor-executable instructions, on execution, may further cause the processor to render the user role-specific response to a display of a user device associated with the user account.

In one embodiment, a non-transitory computer-readable medium storing computer-executable instructions for generating user role-specific responses through Large Language Models (LLMs) is disclosed. In one example, the stored instructions, when executed by a processor, may cause the processor to perform operations including receiving a user query from a user account. The user account may be associated with a user role from a plurality of user roles. The operations may further include combining, based on the user role, the user query with contextual information corresponding to the user query to obtain a combined query. The operations may further include inputting the combined query to an LLM. The operations may further include generating a user role-specific response corresponding to the combined query through the LLM. The operations may further include rendering the user role-specific response to a display of a user device associated with the user account.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
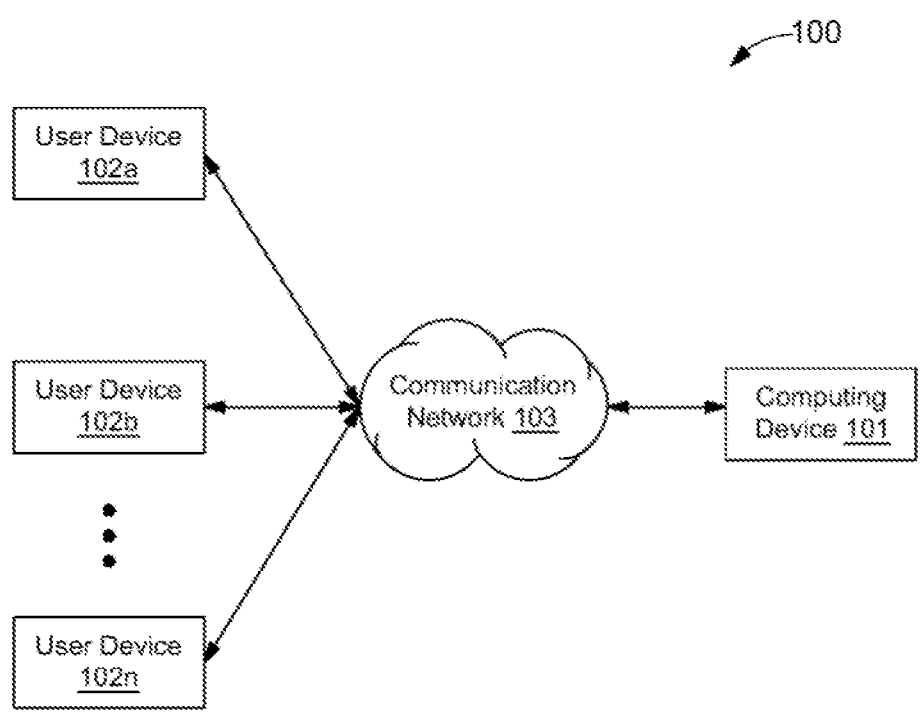
FIG. 1 is a block diagram of an environment for generating user role-specific responses through Large Language Models (LLMs), in accordance with an exemplary embodiment of the present disclosure.

FIG. 1 is a diagram that illustrates an environment 100 for generating user role-specific responses through Large Language Models (LLMs), in accordance with an exemplary embodiment of the present disclosure.

The environment 100 may include a computing device 101 and a plurality of user devices (for example, a user device 102a, a user device 102b, . . . , and a user device 102n) associated with a plurality of users. It should be noted that "the user device 102a, the user device 102b, . . . , and the user device 102n" are collectively referred to as "a plurality of user devices 102" from hereon. The computing device 101 and the plurality of user devices 102 are configured to communicate with each other via a communication network 103. Examples of the communication network 103 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. The computing device 101 and the plurality of user devices 102 need not be located in proximity to each other.

Each of the plurality of user devices 102 may provide the input to the computing device 101 through the communication network 103 via a wired connection or a wireless connection, or a combination thereof. The wired connection between each of the plurality of user devices 102 and the computing device 101 may include, but is not limited to, B-ISDN, DSL, ADSL, ADSL+2, SDSL, VDSL, and cable. The wireless connection between each of the plurality of user devices 102 and the computing device 101 may include, but is not limited to, wireless LAN, wireless MAN, wireless PAN, and wireless WAN.

Elements of the environment 100 may be implemented within an enterprise. The enterprise may be an individual, a group of individuals, a business, a company, an academic institution, or any other organization or institution. The enterprise may include one or more lines of business, subsidiaries, or parent organizations. The enterprise may be physically situated at a single location or may be distributed at multiple locations. In some embodiments, elements of the environment 100 may be implemented among one or more such enterprises.

The computing device 101 may be, but may not be limited to, a tablet, a smartphone, a laptop, a desktop, a server, or any other computing device. In some embodiments, the computing device 101 may be a centralized server or a group of decentralized servers connected with each other through a wired or a wireless connection. For ease of explanation, the computing device 101 is shown as a single entity in FIG. 1. The computing device 101 may be owned and administrated by the enterprise. In embodiments where the elements of the environment 100 are implemented among multiple enterprises, the computing device 101 may be owned and administrated by one or more enterprises. An enterprise (or enterprises) that owns and administrates the computing device 101 may be termed as host enterprise (or enterprises).

The computing device 101 may implement an LLM via an application (for example, a web application, a software application, or a mobile device application). The LLM may be a generative Artificial Intelligence (AI)-based model. In an embodiment, the LLM may be an Artificial Neural Network (ANN) following a transformer architecture. Some non-limiting examples of the LLM include Generative Pre-trained Transformers (GPT)-3.5, GPT-4, Pathways Language Model (PaLM), Large Language Model Meta AI (LLaMA), BigScience Large Open-science Open-access Multilingual Language Model (BLOOM), Enhanced Representation through Knowledge Integration (Ernie), Claude 2, any combination thereof, etc. The application may be installed in a user device. In an embodiment, the application may be deployed in form of a chatbot.

A user may interact with the computing device 101 through at least one of the plurality of user devices 102. By way of an example, the user may be a customer, an employee, or an owner of the host enterprise. The plurality of user devices 102 may include, but may not be limited to, tablets, smartphones, laptops, desktops, servers, or any other computing devices. Each of the plurality of user devices 102 may include one or more input devices, such as a keyboard, a mouse, and the like. Also, each of the plurality of user devices 102 may include one or more output devices, such as a digital screen, an analog screen, speakers, a printer, etc. Each of the plurality of user devices 102 may receive an input from the user in a computer-readable format such as, but not limited to, a text format, a video format, or an image format. Each of the plurality of user devices 102 may provide an output to the user in computer-readable formats such as, but not limited to, a text format, a video format, or an image format.

The user may log in to an associated user account from the user device. A user account may correspond to an account used by the user to sign into the user device or to access any software in a user device. The user may access the GUI and provide a user query through the GUI. The user query may be a question asked by the user or any information that the user may require. In an embodiment, the user may be in form of a prompt. The user may provide the user query as an input to a corresponding user device (such as the user device 102a) via a Graphical User Interface (GUI). The user query may be in form of a text input (e.g., a chat message or a text file), a document file (e.g., a Portable Document Format (PDF) file), an image file, an audio input (e.g., a voice note), or a video input (e.g., a video file or a live video), or a combination thereof. The user device 102*a* may transmit the user query to the computing device 101. The computing device 101 may provide the user query as an input to the LLM. The LLM may generate a response to the user query. The computing device 101 may then transmit the response to the user device 102*a*.

However, it should be noted that the response to the user query may be a generic response. In other words, if another user provides the same user query, the response generated by the LLM may be the same. Such responses may not be relevant to the user who provided the user query because the response may lack context and may not be specific to enterprise requirements and user requirements.

In order to overcome such limitations, the computing device 101 may implement a Retrieval Augmented Generation (RAG) technique. RAG is a framework that combines retrieval models and generative models to produce text that is grounded on external data sources (or knowledge sources). RAG may improve quality and reliability of LLM responses by providing relevant data or documents as context for the LLM. Thus, the RAG may improve performance of an LLM and is also a cost-effective alternative to fine-tuning the entire LLM. In RAG, the response of the LLM is augmented by grounding the LLM to pre-configured external data sources which include vector embeddings. The relevant data or documents may be obtained from a variety of external data sources, such as the internet, databases, or other text data sources in one non-limiting embodiment. This would make the response generated by the LLM more relevant with respect to requirements of the enterprise.

However, RAG has some limitations as well. While the responses generated by an RAG-assisted LLM may be more relevant with respect to the enterprise requirements, the responses may still lack specificity with respect to the user requirements. This is because, while the responses may be more context-aware, the external data sources may lack organization with respect to different user roles in the enterprise. This may make data retrieval process inefficient and inaccurate with respect to the user. Moreover, the enterprise may require that a certain group of users to get a certain type of responses (for example, a customer should not be given confidential enterprise details, a junior employee should not be given salary details of other employees that are not reporting to the junior employee, etc.). RAG may fail to address such problems.

In one non-limiting example, assuming that users such as a 'line engineer' and a 'senior executive' of the enterprise access the LLM to find out relevant information on a similar query, for instance, "what is the company policy for travel reimbursements?", then the RAG-assisted LLM may also generate similar responses for both the line engineer and the senior executive. Thus, a conventional RAG-assisted LLM may be incapable of differentiating amongst different responses for different user roles in an organization/enterprise which may lead to information overload or information deficit based on the associated role or rank of the user. For instance, for some questions, the senior executives may need only a high-level response, while a person working in a relevant function may need a more detailed response.

To overcome the above-mentioned limitations of RAG, the computing device 101 may implement a nested RAG (n-RAG) technique rather than a RAG technique to further enhance the quality and specificity of the LLM-generated response. In n-RAG, information from multiple knowledge repositories for a user role (i.e., a group or a category of users predefined by the enterprise) are obtained. Examples of the user role may include, Chief Executive Officer (CEO), senior executive, delivery manager, finance head, Human Resources (HR) head, operations head, etc. Herein, it may be understood that the term "user role" may refer to a predefined set of permissions and access rights assigned to a user within an organizational hierarchy, dictating the scope of actions, data access, and operational capabilities available to the user within a software system or application. A user role is designed to reflect the user's position, responsibilities, and functional requirements within the organization, ensuring that access to information and system functionalities is appropriately restricted and aligned with the organizational governance and security policies. User roles facilitate the management of user privileges in a granular and efficient manner, enabling the disclosed system to dynamically adjust the user's interaction capabilities based on their role. This concept is integral to the enforcement of a secure, role-based access control (RBAC) mechanism within the system, which is critical for protecting sensitive information and ensuring that operational tasks are executed within the bounds of authorized permissions. The definition and implementation of user roles are pivotal for automating the assignment of access rights, streamlining administrative processes, and enhancing the overall security and efficiency of the system's operation within the enterprise environment.

The information obtained from multiple knowledge repositories is then broken into one or more data chunks, and then converted into corresponding vector embeddings. The knowledge repositories may be documents such as policy documents, employee data, customer data, and the like corresponding to an organization/enterprise. It will be noted that the terms organization and enterprise are used interchangeably throughout the description. In some embodiments, the knowledge repositories may be fetched from external databases. The knowledge repositories may be broken into different data chunks. For example, in an organization, one or more data chunks may be policies specific for different departments such as for human resources, (HR), Information systems (IT), recruitment team, engineering team, administrative team, legal team and the like. Thus, a first data chunk may correspond to policies applicable to IT team, a second data chunk may correspond to policies applicable to HR team and so on. In some embodiments, the data chunks may correspond to user roles. For example, a third data chunk may correspond to HR policies corresponding to junior employee of an organization. A fourth data chunk may correspond to HR policies corresponding to manager in an organization and the like.

Herein, a "data chunk" refers to a discrete, manageable segment of data that is processed by a large language model (LLM) to perform various tasks within enterprise applications. Each data chunk consists of a collection of data elements, which may include text, numerical data, or metadata, formatted and structured in a way that is optimized for efficient processing and analysis by the LLM. The creation of a data chunk involves segmenting larger datasets into smaller, more manageable pieces that can be individually analyzed, manipulated, or transformed by the LLM to derive insights, make predictions, or automate tasks specific to enterprise needs. This segmentation not only facilitates the handling of large volumes of data but also enables parallel processing, thereby enhancing the performance and scalability of enterprise applications. The use of data chunks is crucial for optimizing the LLM's ability to process and interpret complex data structures, thereby improving the accuracy and efficiency of data-driven decisions and operations within the enterprise environment.

The data chunks may be converted to one or more vector embeddings. A data chunk may be converted to a vector embedding using techniques such as text-to vector embeddings, wherein the text in the data chunk may be converted into vector embeddings to represent the semantic meaning of the text. These vector embeddings may be used for various tasks, such as information retrieval and generation. To convert text in the data chunk to vector embedding, one or more pre-trained models such as Word2Vec, GloVe, FastText, or BERT may be used. Each of these models may employ different techniques to represent words or sentences as vectors in a high-dimensional space. For example, Word2Vec models may provide vector embeddings for individual words. The vector embeddings may be averaged or concatenated to represent a sentence or document. One or more vector embeddings are associated with other vector embeddings based on user roles using links to obtain linked vector embeddings.

Further, in n-RAG, the linked vector embeddings are stored in multiple levels. A plurality of linked vector embeddings corresponding to each of a plurality of user roles (i.e., groups or categories of users predefined by the enterprise) is stored in a vector database specific to a user role in an arrangement based on predefined relationships between the corresponding plurality of user roles. The vector database for each of the plurality of user roles may, in turn, be stored in the one or more data sources. The predefined relationships between the plurality of user roles may be defined in a hierarchical form or other arrangement structures. In an embodiment, the plurality of linked vector embeddings corresponding to each of the plurality of user roles may be nested within one another. Application of n-RAG to LLMs goes beyond the existing techniques of generating similar responses to similar questionaries and is capable of providing tailored responses depending on the user role/rank or type of the particular user accessing the LLM to better meet user requirements.

It should be noted that administration of the enterprise may assign the user role to the user. The user role may be one of the plurality of user roles predefined by the enterprise. In some embodiments, the user role may be associated with the user account of the user. In such case, the user account may be created by the administration of the enterprise. Alternatively, the user account may be created by the user. In such case, the user role may be selected from the plurality of user roles by the user during user account creation. Further, upon receiving the user query from the user account, the computing device 101 may extract the user role from data associated with the user account. Alternatively, the computing device 101 may receive the user role as an input from the user device 102a along with the user query.

Further, upon receiving the user query, the computing device 101, based on the user role, may extract contextual information based on the user query from the one or more external data sources (referred to as 'one or more data sources' from hereon). Contextual information refers to data extracted from the plurality of linked vector embeddings corresponding to the user role. In some embodiments, the contextual information may itself be a data structure in the form of vector embeddings. The one or more data sources may include the plurality of linked vector embeddings corresponding to the plurality of user roles.

For example, in an enterprise, the CEO may be directly supervising three general managers and a Chief Financial Officer (CFO). The CFO may be directly supervising a senior manager. Thus, the one or more data sources may store the plurality of linked vector embeddings corresponding to each of the above-mentioned user roles based on the corresponding predefined relationships. Further, the plurality of linked vector embeddings corresponding to each of the three general managers and the CFO may be nested within the plurality of linked vector embeddings corresponding to the CEO (based on the predefined relationships). Thus, when the LLM retrieves contextual information from the plurality of linked vector embeddings for a user query by a CFO, it ensures that the user role-specific response generated by the LLM is specific to the CFO and not to the three general managers.

In one example, the user may be associated with a user role within the enterprise (for example, a junior associate). The user may be using the user device 102a. The user may log in to the application by providing user account credentials via the GUI. The user account credentials may be unique to the user account. The user may then provide a user query as an input via the GUI. The user query may be, for example, "what is the company policy for travel reimbursements?". The user query may then be transmitted from the user device 102a to the computing device 101 via the communication network 103. Further, upon receiving the user query, the computing device 101 may extract the user role (i.e., "junior associate") from the data associated with the user account of the user. Alternatively, the user may provide the user role via the GUI. The GUI may include a GUI element (such as a text box) for the user to provide the user role along with the user query or, once the user inputs the user query, the GUI may render a follow-up query to obtain the user role (for example, the follow-up query may be "please provide your user role in the enterprise").

Further, the computing device 101, based on the user role, may extract contextual information based on the user query from the one or more data sources. The contextual information may include data (either processed (e.g., in form of vector embeddings) or unprocessed (e.g., in form of tokens or strings)) from one or more of the plurality of linked vector embeddings corresponding to the user role of junior associate, stored in the one or more data sources. In an embodiment, the contextual information may be based on data derived from documents (such as employee contracts, company policy, Key Performance Indicators (KPIs), etc.) specific for the user role. For example, the contextual information corresponding to the user role of "junior associate" may be, "junior associates have a six-month probation period from date of joining". The contextual information may be stored in form of a vector embedding (for example, [0.4, 0.1, 0.2, 0.3]). Further, the computing device 101 may combine the user query with contextual information corresponding to the user query to obtain a combined query using the n-RAG technique. By way of an example, the combined query may be represented as a pair, i.e., "junior associate":"junior associates have a six-month probation period from date of joining". The pair representation of the combined query may be of corresponding vector embeddings, for example, [0.6, 0.1]: [0.4, 0.1, 0.2, 0.3]. Further, the computing device 101 may input the vector embeddings corresponding to the combined query to the LLM. Further, the computing device 101 may generate a user-role specific response corresponding to the combined query through the LLM. Herein, the term "user role-specific response" refers to a customized reply generated by the disclosed system, tailored to the unique permissions, access rights, and information needs associated with the user's role within the enterprise. This response is dynamically crafted in reaction to queries or actions initiated by the user, taking into account the specific privileges and data access levels defined by their role in the organizational hierarchy. From a system functionality perspective, user role-specific responses ensure that the information provided, or actions permitted are directly relevant and appropriate to the user's responsibilities and authority level. The system assesses the user's role and the context of the query or request to determine the scope and nature of the response, thereby enforcing role-based access control (RBAC) principles and maintaining information security and operational integrity. This mechanism facilitates efficient information dissemination and decision-making processes within the organization, ensuring that users receive information and perform actions that are aligned with their roles and contribute to the organization's operational efficiency and security protocols.

Further, the computing device 101 may render the user role-specific response (i.e., the company policy for travel reimbursements specific to junior associates of the enterprise) to the display of the user device 102a associated with the user account.

In another example, the user may be external to the enterprise (for example, a premium customer) and may be assigned a user role by the enterprise. The user may be using the user device 102a. The user may log in to the application by providing user account credentials via the GUI. The user account credentials may be unique to the user account. The user may then provide a user query as an input via the GUI. The user query may be, for example, "what is the company policy for return of damaged products?". The user query may then be transmitted from the user device 102a to the computing device 101 via the communication network 103. Further, upon receiving the user query, the computing device 101 may extract the user role (i.e., "premium customer") from the data associated with the user account of the user.

Further, the computing device 101, based on the user role, may extract contextual information based on the user query from the one or more data sources. The contextual information may include data (either processed (e.g., in form of vector embeddings) or unprocessed (e.g., in form of tokens or strings)) from one or more of the plurality of linked vector embeddings corresponding to the user role of premium customer, stored in the one or more data sources. In an embodiment, the contextual information may be based on data derived from documents (such as company service policy for premium customers, terms and conditions, etc.) specific for the user role. For example, the contextual information corresponding to the user role of "premium customer" may be, "premium customers are offered money back guarantee for physically damaged or defective products". The contextual information may be stored in form of a vector embedding (for example, [0.3, 0.7, 0.2, 0.3]). The computing device 101 may combine the user query with contextual information corresponding to the user query to obtain a combined query. By way of an example, the combined query may be represented as a pair, i.e., "premium customer": "premium customers are offered money back guarantee for physically damaged or defective products". The pair representation of the combined query may be of corresponding vector embeddings, for example, [0.3, 0.6]: [0.3, 0.7, 0.2, 0.3]. The computing device 101 may input the combined query to the LLM. The computing device 101 may generate a user role-specific response corresponding to the combined query through the LLM. Further, the computing device 101 may render the user role-specific response (i.e., the company policy for return of damaged products specific to premium customers) to the display of the user device 102a associated with the user account.

In another example, a first user may be associated with a first user role (for example, an associate) within the enterprise and a second user may be associated with a second user role (for example, a manager) within the enterprise. The first user may be using the user device 102a, accessing a first GUI and the second user may be using the user device 102b, accessing a second GUI. The first user and the second user may provide a user query as an input via the first GUI and the second GUI, respectively. The user query may be, for example, "what is the company policy for travel reimbursements?". Upon receiving the user queries from both the user devices, the computing device 101 may extract the respective user roles (i.e., "associate" for the first user account and "manager" for the second user account) from the data associated with the respective user accounts of the first user and the second user. Alternatively, the first user and the second user may provide the respective user roles via respective GUIs. The first GUI and the second GUI may include a GUI element (such as a text box) for the first user and the second user, respectively, to provide the respective user roles along with the user query or, once the user query is input, the first GUI and the second GUI may include a follow-up query to obtain the respective user roles (for example, the follow-up query may be "please provide your user role in the enterprise").

Further, the computing device 101, based on the user role, may extract contextual information based on the user query from the one or more data sources. So, the computing device 101 may extract first contextual information corresponding to associates for the first user and may extract second contextual information corresponding to managers for the second user. For example, the first contextual information may be, "associates have a six-month probation period from date of joining" and the second contextual information may be "managers are L4 employees of the company". The first contextual information and the second contextual information may be stored in form of vector embeddings [0.4, 0.1, 0.2, 0.3] and [0.2,0.4,0.4,0.2], respectively. For the first user and the second user, the computing device 101 may combine the user query with the first contextual information and the second contextual information, respectively, to obtain a first combined query and a second combined query. By way of an example, the first combined query may be "associate": "associates have a six-month probation period from date of joining". The second combined query may be "managers": "managers are L4 employees of the company". The pair representation of vector embeddings corresponding to the first combined query and the second combined query may be, for example, [0.6, 0.1]: [0.4, 0.1, 0.2, 0.3] and [0.5, 0.5]: [0.5, 0.1, 0.6, 0.4], respectively. The computing device 101 may generate a first user role-specific response and a second user role-specific response corresponding to the first combined query and the second combined query, respectively, through the LLM. The computing device 101 may render the first user role-specific response and the second user role-specific response to the display of the user device 102a and the user device 102b, respectively. Thus, the first user role-specific response may include the company policy for travel reimbursements specific to associates of the enterprise, and the second user role-specific response may include the company policy for travel reimbursements specific to managers of the enterprise.

Additionally, the computing device 101 may assign data access control of the first user account to the second user account based on the user role.

Herein, the term "data access control" may refer to the systematic framework and mechanisms implemented within a computing device to manage and restrict the access of users to specific data sets based on predefined privileges. These privileges are meticulously assigned to users or user roles within an organizational hierarchy, determining the extent to which individuals can view, modify, delete, or distribute data. The primary objective of data access control is to ensure that sensitive information is only accessible to authorized users, thereby safeguarding the integrity, confidentiality, and availability of data within the system. This is achieved through the enforcement of policies and rules that align with the enterprise's security requirements and regulatory compliance obligations. Data access control mechanisms include, but are not limited to, authentication procedures, authorization checks, and encryption protocols, which collectively contribute to a secure data environment. These controls are pivotal for preventing unauthorized access and data breaches, facilitating the responsible management of data resources in alignment with the enterprise's operational and security objectives.

The data access control may be based on a relationship of the user role with remaining of the plurality of user roles. For instance, a user with user role defined as 'a manager' may be assigned the data access control for an associate (provided that an associate directly or indirectly reports to the manager and/or based on enterprise policy). This ensures that the associate is not rendered confidential information (such as salary details of the manager, performance details of the manager, benefits/compensations provided to the manager, etc.) in the first user role-specific response, while the manager may obtain broad-level information about the associate and/or as defined in the enterprise policy.

In another example, a first user and a second user may be external to the enterprise and may be assigned a first user role (for example, a premium customer) and a second user role (for example, a regular customer), respectively, by the enterprise. The first user may be using the user device 102*a* and the second user may be using the user device 102*b*. The first user and the second user may provide a user query as an input via a first GUI and a second GUI, respectively. The user query may be, for example, "what is the company policy for return of damaged products?". Upon receiving the user query, the computing device 101 may extract the respective user roles (i.e., "premium customer" for the first user account and "regular customer" for the second user account) from the data associated with the respective user accounts of the first user and the second user.

The computing device 101 may extract first contextual information corresponding to premium customers for the first user and may extract second contextual information corresponding to regular customers for the second user. For example, the first contextual information may be, "premium customers are offered money back guarantee for physically damaged or defective products" and the second contextual information may be "defective products may be replaced for regular customers after appropriate verification by a delivery partner". The first contextual information and the second contextual information may be stored in form of vector embeddings [0.3, 0.7, 0.2, 0.3] and [0.4,0.2,0.1,0.2], respectively. For each of the first user and the second user, the computing device 101 may combine the user query with the first contextual information and the second contextual information corresponding to the user query to obtain a first combined query and a second combined query, respectively. By way of an example, the first combined query may be "premium customers": "premium customers are offered money back guarantee for physically damaged or defective products". The second combined query may be "regular customers": "defective products may be replaced for regular customers after appropriate verification by a delivery partner". The pair representation of vector embeddings corresponding to the first combined query and the second combined query may be, for example, [0.6, 0.1]: [0.3, 0.7, 0.2, 0.3] and [0.1, 0.4]: [0.4, 0.2, 0.1, 0.2], respectively. The computing device 101 may generate a first user role-specific response and a second user role-specific response corresponding to the first combined query and the second combined query, respectively, through the LLM. The computing device 101 may render the first user role-specific response and the second user role-specific response to the displays of the user device 102*a* and the user device 102*b*, respectively. Thus, the first user role-specific response may include the company policy for return of damaged products specific to premium customers of the enterprise, and the second user role-specific response may include the company policy for return of damaged products specific to regular customers of the enterprise.

Figure 2:
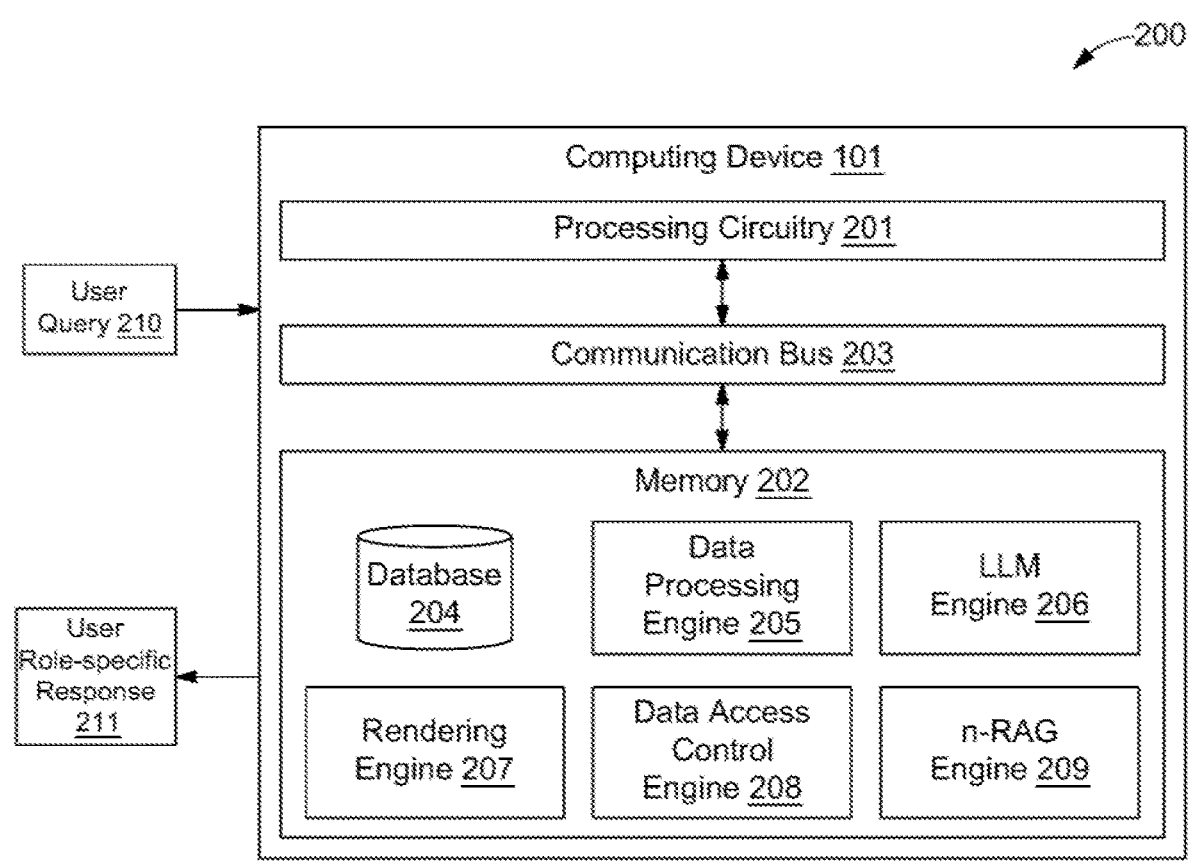
FIG. 2 is a block diagram of a system for generating user role-specific responses through LLMs, in accordance with an exemplary embodiment of the present disclosure.

FIG. 2 is a block diagram that illustrates a system 200 for generating user role-specific responses through LLMs, in accordance with an exemplary embodiment of the present disclosure. FIG. 2 is explained in conjunction with elements from FIG. 1. The system 200 may include the computing device 101. In an embodiment, the computing device 101 may include a processing circuitry 201 and a memory 202 communicatively coupled to the processing circuitry 201 via a communication bus 203. The memory 202 may store processor instructions. The processor instructions, when executed by the processing circuitry 201, may cause the processing circuitry 201 to implement one or more embodiments of the present disclosure such as, but not limited to, storing a plurality of vector embeddings in one or more data sources, extracting contextual information from the one or more data sources, and generating a user role-specific response corresponding to user query through an LLM. The memory 202 of the computing device 101 may include a database 204, a data processing engine 205, an LLM engine 206, a rendering engine 207, a data access control engine 208, and a nested Retrieval Augmented Generation (n-RAG) engine 209.

In an embodiment, the database 204 of the computing device 101 may include an organized collection of structured information, or data, typically stored electronically in the memory 202. The database 204 may be managed by a database management system (DBMS). It should be noted that the database may include the one or more data sources storing the plurality of linked vector embeddings, user role data, and the like.

Further, the data processing engine 205 may receive a user query 210 from a user account. The user account may be associated with a user role from a plurality of user roles. It should be noted that the data processing engine 205 may, at least one of, extract the user role from data associated with the user account or receive the user role as an input from the user device.

Further, the data processing engine 205 may combine, based on the user role, the user query 210 with contextual information corresponding to the user query to obtain a combined query. It should be noted that the contextual information may include information relevant to the user role. The data processing engine 205 may input the combined query to the LLM engine 206.

The LLM engine 206 may include an LLM. Further, the LLM engine 206 may generate a user role-specific response corresponding to the combined query through the LLM. Since the combined query includes the user query 210 as well as the contextual information (which is in turn based on the user role), the response generated by the LLM may be more relevant to the user role (i.e., user role-specific response).

The rendering engine 207 may render the user role-specific response to a display of the user device associated with the user account. The data access control engine 208 may assign data access control to the user account based on the user role. The data access control may be based on a relationship of the user role with remaining of the plurality of user roles.

The n-RAG engine 209 may receive source data including user role data corresponding to the plurality of user roles from the one or more data sources. Further, the n-RAG engine 209 may generate one or more data chunks from the user role data. The n-RAG engine 209 may transform the one or more data chunks into a plurality of vector embeddings. The n-RAG engine 209 may associate the plurality of vector embeddings with the one or more data chunks based on the user role using a plurality of links to obtain a plurality of linked vector embeddings. The n-RAG engine 209 may store the plurality of linked vector embeddings in the one or more data sources in an arrangement based on predefined relationships between the corresponding plurality of user roles. The n-RAG engine 209 may extract the contextual information from one or more data sources. The one or more data sources may include the plurality of vector embeddings corresponding to the plurality of user roles. Thus, more specifically, the contextual information may be based on a linked vector embedding from the plurality of linked vector embeddings. The contextual information may include information associated with the user role stored in the linked vector embedding.

In one example, the user may be associated with a user role within the enterprise (for example, a junior associate). The user may be using the user device 102a. The user may log in to the application by providing user account credentials via the GUI. The user may then provide the user query 210 as an input via the GUI. The user query 210 may be, for example, "what is the company policy for travel reimbursements?". The user query 210 may then be transmitted from the user device 102a to the computing device 101 via the communication network 103. Further, upon receiving the user query 210, the data processing engine 205 may extract the user role (i.e., "junior associate") from the data associated with the user account of the user. Alternatively, the user may provide the user role via the GUI.

Further, the n-RAG engine 209, based on the user role, may extract contextual information based on the user query 210 from the database 204. The contextual information may include data (either processed (e.g., in form of vector embeddings) or unprocessed (e.g., in form of tokens or strings)) from one or more of the plurality of linked vector embeddings corresponding to the user role of junior associate, stored in the one or more data sources. In an embodiment, the contextual information may be based on data derived from documents (such as employee contracts, company policy, Key Performance Indicators (KPIs), etc.) specific for the user role. For example, the contextual information corresponding to the user role of "junior associate" may be, "junior associates have a six-month probation period from date of joining". The contextual information may be stored in form of a vector embedding (for example, [0.4, 0.1, 0.2, 0.3]). The data processing engine 205 may combine the user query 210 with contextual information corresponding to the user query 210 to obtain a combined query. By way of an example, the combined query may be represented as a pair, i.e., "junior associate": "junior associates have a six-month probation period from date of joining". The pair representation of the combined query may be of corresponding vector embeddings, for example, [0.6, 0.1]: [0.4, 0.1, 0.2, 0.3]. The data processing engine 205 may input the vector embeddings corresponding to the combined query to the LLM engine 206. The LLM engine 206 may generate the user role-specific response 211 corresponding to the combined query through the LLM. Further, the rendering engine 207 may render the user role-specific response 211 (i.e., the company policy for travel reimbursements specific to junior associates of the enterprise) to the display of the user device 102a associated with the user account.

In another example, the user may be external to the enterprise (for example, a premium customer) and may be assigned a user role by the enterprise. The user may be using the user device 102a. The user may log in to the application by providing user account credentials via the GUI. The user account credentials may be unique to the user account. The user may then provide the user query 210 as an input via the GUI. The user query 210 may be, for example, "what is the company policy for return of damaged products?". The user query 210 may then be transmitted from the user device 102a to the computing device 101 via the communication network 103. Further, upon receiving the user query 210, the data processing engine 205 may extract the user role (i.e., "premium customer") from the data associated with the user account of the user.

Further, the n-RAG engine 209, based on the user role, may extract contextual information based on the user query 210 from the one or more data sources. The contextual information may include data (either processed (e.g., in form of vector embeddings) or unprocessed (e.g., in form of tokens or strings)) from one or more of the plurality of linked vector embeddings corresponding to the user role of premium customer, stored in the one or more data sources. In an embodiment, the contextual information may be based on data derived from documents (such as company service policy for premium customers, terms and conditions, etc.) specific for the user role. For example, the contextual information corresponding to the user role of "premium customer" may be, "premium customers are offered money back guarantee for physically damaged or defective products". The contextual information may be stored in form of a vector embedding (for example, [0.3, 0.7, 0.2, 0.3]). Further, the data processing engine 205 may combine the user query 210 with contextual information corresponding to the user query 210 to obtain a combined query. By way of an example, the combined query may be represented as a pair, i.e., "premium customer": "premium customers are offered money back guarantee for physically damaged or defective products". The pair representation of the combined query may be of corresponding vector embeddings, for example, [0.3, 0.6]: [0.3, 0.7, 0.2, 0.3]. The data processing engine 205 may input the vector embeddings corresponding to the combined query to the LLM engine 206. The LLM engine 206 may generate the user role-specific response 211 corresponding to the combined query through the LLM. The rendering engine 207 may render the user role-specific response 211 (i.e., the company policy for return of damaged products specific to premium customers) to the display of the user device 102a associated with the user account.

In another example, a first user may be associated with a first user role (for example, an associate) within the enterprise and a second user may be associated with a second user role (for example, a manager) within the enterprise. The first user may be using the user device 102a, accessing a first GUI and the second user may be using the user device 102b, accessing a second GUI. The first user and the second user may log in to the application by providing respective user account credentials via respective GUIs rendered on the user device 102a and the user device 102b. The first user and the second user may then provide the user query 210 as an input via the first GUI and the second GUI, respectively. The user query 210 may be, for example, "what is the company policy for travel reimbursements?". Upon receiving the user query 210, the data processing engine 205 may extract the respective user roles (i.e., "associate" for the first user account and "manager" for the second user account) from the data associated with the respective user accounts of the first user and the second user. Alternatively, the first user and the second user may provide the respective user roles via the first GUI and the second GUI, respectively.

Further, the n-RAG engine 209, based on the user role, may extract contextual information based on the user query 210 from the one or more data sources. So, the n-RAG engine 209 may extract first contextual information corresponding to associates for the first user and may extract second contextual information corresponding to managers for the second user. The first contextual information may be obtained from a plurality of vector embeddings stored for the user role of associates. The second contextual information may be obtained from a plurality of vector embeddings stored for the user role of managers. In the one or more data sources, the plurality of vector embeddings for each of a plurality of user roles may be arranged based on a predefined relationship between the plurality of user roles. For example, the plurality of vector embeddings corresponding to the associates may be nested within the plurality of vector embeddings corresponding to the managers in a hierarchical arrangement. A parent-child relationship between the plurality of vector embeddings may prevent rendering of sensitive information to nested user roles. For example, the first contextual information may be, "associates have a six-month probation period from date of joining" and the second contextual information may be "managers are L4 employees of the company". The first contextual information and the second contextual information may be stored in form of vector embeddings [0.4, 0.1, 0.2, 0.3] and [0.2,0.4,0.4,0.2], respectively. For the first user and the second user, the data processing engine 205 may combine the user query 210 with the first contextual information and the second contextual information, respectively, corresponding to the user query to obtain a first combined query and a second combined query. By way of an example, the first combined query may be "associate": "associates have a six-month probation period from date of joining". The second combined query may be "managers": "managers are L4 employees of the company". The pair representation of vector embeddings corresponding to the first combined query and the second combined query may be, for example, [0.6, 0.1]: [0.4, 0.1, 0.2, 0.3] and [0.5, 0.5]: [0.5, 0.1, 0.6, 0.4], respectively. The LLM engine 206 may generate a first user role-specific response and a second user role-specific response for the first user account and the second user account, respectively, corresponding to the first combined query and the second combined query through the LLM. The rendering engine 207 may render the first user role-specific response and the second user role-specific response to respective displays of the user device 102a and the user device 102b. Thus, the first user role-specific response may include the company policy for travel reimbursements specific to associates of the enterprise, and the second user role-specific response may include the company policy for travel reimbursements specific to managers of the enterprise.

Additionally, the data access control engine 208 may assign data access control of the first user account to the second user account based on the user role. The data access control may be based on a relationship of the user role with remaining of the plurality of user roles. Here, the manager may be assigned the data access control for the associate (provided that the associate directly reports to the manager and/or based on enterprise policy). This ensures that the associate is not rendered confidential information (such as salary details of the manager, performance details of the manager, benefits/compensations provided to the manager, etc.) in the first user role-specific response, while the manager can obtain broad-level information about the associate.

In another example, a first user and a second user may be external to the enterprise and may be assigned a first user role (for example, a premium customer) and a second user role (for example, a regular customer), respectively, by the enterprise. The first user may be using the user device 102a and the second user may be using the user device 102b. The first user and the second user may provide the user query 210 as an input via a first GUI and a second GUI, respectively. The user query may be, for example, "what is the company policy for return of damaged products?". Upon receiving the user query 210, the data processing engine 205 may extract the respective user roles (i.e., "premium customer" for the first user account and "regular customer" for the second user account) from the data associated with the respective user accounts of the first user and the second user.

The n-RAG engine 209 may extract first contextual information corresponding to premium customers for the first user and may extract second contextual information corresponding to regular customers for the second user. For example, the first contextual information may be, "premium customers are offered money back guarantee for physically damaged or defective products" and the second contextual information may be "defective products may be replaced for regular customers after appropriate verification by a delivery partner". The first contextual information and the second contextual information may be stored in form of vector embeddings [0.3, 0.7, 0.2, 0.3] and [0.4,0.2,0.1,0.2], respectively. For each of the first user and the second user, the computing device 101 may combine the user query 210 with the first contextual information and the second contextual information corresponding to the user query to obtain a first combined query and a second combined query, respectively. By way of an example, the first combined query may be "premium customers": "premium customers are offered money back guarantee for physically damaged or defective products". The second combined query may be "regular customers": "defective products may be replaced for regular customers after appropriate verification by a delivery partner". The pair representation of vector embeddings corresponding to the first combined query and the second combined query may be, for example, [0.6, 0.1]: [0.3, 0.7, 0.2, 0.3] and [0.1, 0.4]: [0.4, 0.2, 0.1, 0.2], respectively. Further, the LLM engine 206 may generate a first user role-specific response and a second user role-specific response corresponding to the first combined query and the second combined query, respectively, through the LLM. The rendering engine 207 may render the first user role-specific response and the second user role-specific response to the displays of the user device 102a and the user device 102b, respectively. Thus, the first user role-specific response may include the company policy for return of damaged products specific to premium customers of the enterprise, and the second user role-specific response may include the company policy for return of damaged products specific to regular customers of the enterprise.

It should be noted that all such aforementioned engines 205-209 may be represented as a single module or a combination of different modules. Further, as will be appreciated by those skilled in the art, each of the engines 205-209 may reside, in whole or in parts, on one device or multiple devices in communication with each other. In some embodiments, each of the engines 205-209 may be implemented as dedicated hardware circuit comprising custom application-specific integrated circuit (ASIC) or gate arrays, off-the-shelf semiconductors such as logic chips, transistors, or other discrete components. Each of the engines 205-209 may also be implemented in a programmable hardware device such as a field programmable gate array (FPGA), programmable array logic, programmable logic device, and so forth. Alternatively, each of the engines 205-209 may be implemented in software for execution by various types of processors (e.g., the processing circuitry 201). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for generating user role-specific responses through LLMs. For example, the exemplary computing device 101 may generate user role-specific responses through LLMs by the processes discussed herein. In particular, as will be appreciated by those of ordinary skill in the art, control logic and/or automated routines for performing the techniques and steps described herein may be implemented by the computing device 101 either by hardware, software, or combinations of hardware and software. For example, suitable code may be accessed and executed by the one or more processors on the computing device 101 to perform some or all of the techniques described herein. Similarly, application specific integrated circuits (ASICs) configured to perform some, or all of the processes described herein may be included in the one or more processors on the computing device 101.

Figure 3:
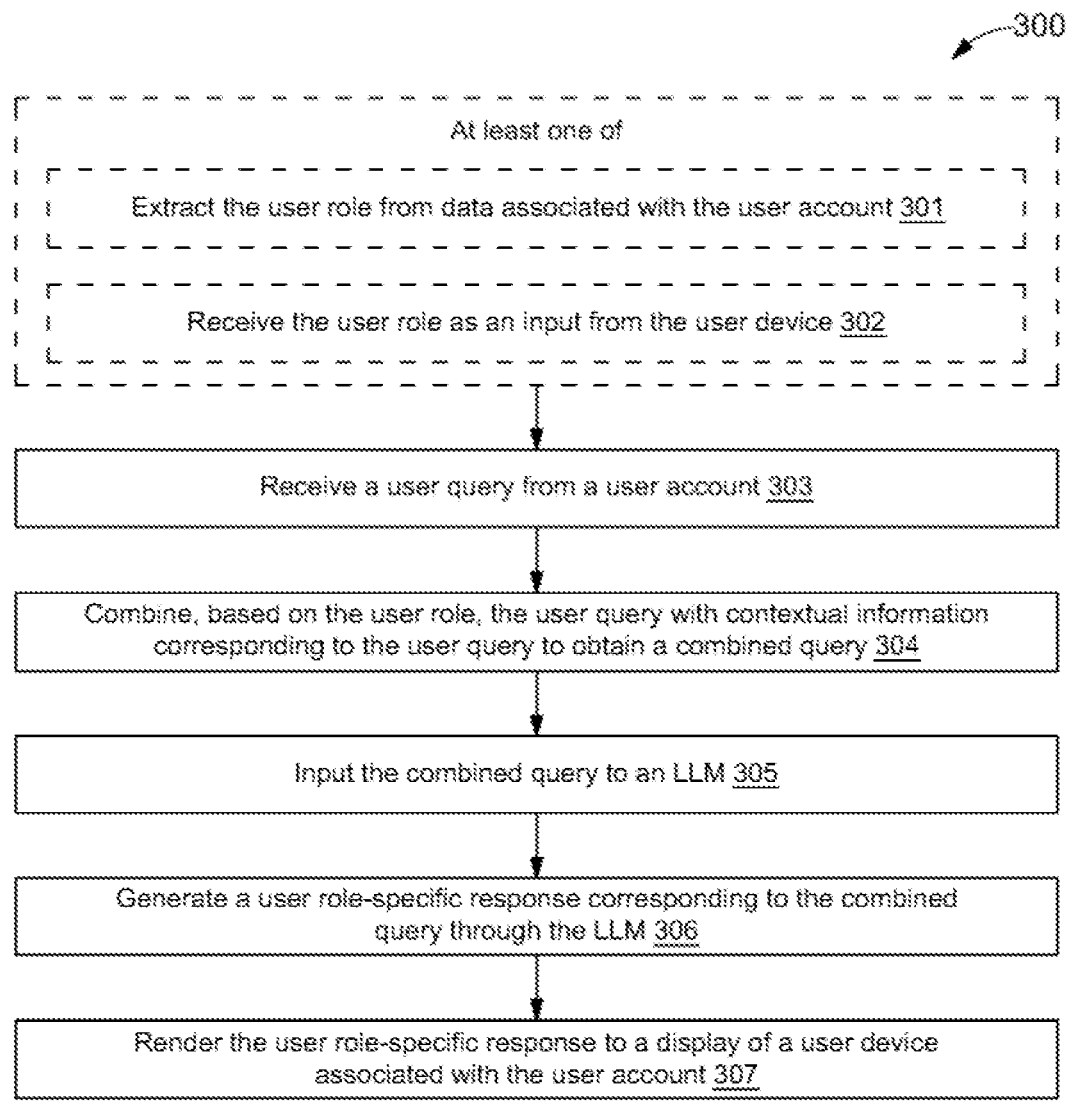
FIG. 3 is a flow diagram of an exemplary process for generating user role-specific responses through LLMs, in accordance with an exemplary embodiment of the present disclosure.

FIG. 3 is a diagram that illustrates an exemplary process 300 for generating user role-specific responses through LLMs, in accordance with an exemplary embodiment of the present disclosure. FIG. 3 is explained in conjunction with elements from FIGS. 1 and 2. In an embodiment, the process 300 may be implemented by the computing device 101. The process 300 may be initiated by a user accessing an associated user account via a user device (for example, the user device 102a). The user account may be associated with a user role from a plurality of user roles. The process 300 may include extracting, by the data processing engine 205, user role from data associated with a user account, at step 301. Alternatively, the process 300 may include receiving, by the data processing engine 205, the user role as an input from the user device, at step 302. It should be noted that at least one of step 301 or step 302 may be performed.

Further, the process 300 may include receiving, by the data processing engine 205, a user query (e.g., the user query 210) from the user account, at step 303. Further, the process 300 may include combining, based on the user role and by the data processing engine 205, the user query with contextual information corresponding to the user query to obtain a combined query, at step 304. The contextual information may be extracted by the n-RAG engine 209 and provided to the data processing engine 205 (this is explained in detail in conjunction with FIG. 4).

Further, the process 300 may include inputting, by the data processing engine 205, the combined query to an LLM, at step 305. Further, the process 300 may include generating, by the LLM engine 206, a user role-specific response (e.g., the user role-specific response 211) corresponding to the combined query through the LLM, at step 306. Further, the process 300 may include rendering, by the rendering engine 207, the user role-specific response to a display of the user device associated with the user account, at step 307.

Further, the process 300 may include assigning, by the data access control engine 208, data access control to the user account based on the user role. The data access control may be based on a relationship of the user role with remaining of the plurality of user roles.

Figure 4:
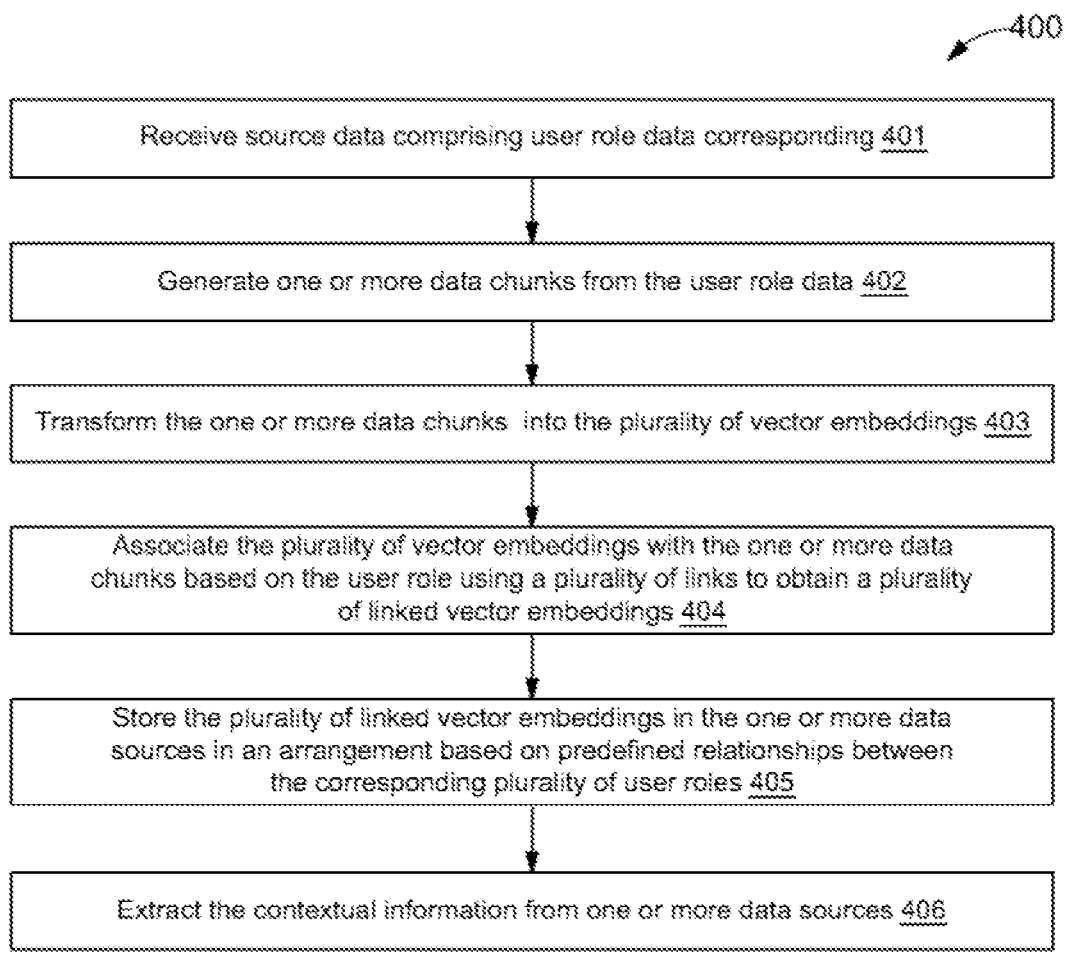
FIG. 4 is a flow diagram of an exemplary process for storing and extracting contextual information from data sources, in accordance with an exemplary embodiment of the present disclosure.

FIG. 4 is a diagram that illustrates an exemplary process 400 for storing and extracting contextual information from data sources, in accordance with an exemplary embodiment of the present disclosure. FIG. 4 is explained in conjunction with elements from FIGS. 1, 2, and 3. In an embodiment, the process 400 may be implemented by the computing device 101. The process 400 may include receiving, by the n-RAG engine 209, source data including user role data corresponding to the plurality of user roles from the one or more data sources, at step 401.

The process 400 may include generating, by the n-RAG engine 209, one or more data chunks from the user role data, at step 402.

The process 400 may include transforming, by the n-RAG engine 209, the one or more data chunks into the plurality of vector embeddings, at step 403.

The process 400 may include associating, by the n-RAG engine 209, the plurality of vector embeddings with the one or more data chunks based on the user role using a plurality of links to obtain a plurality of linked vector embeddings, at step 404.

The process 400 may include storing, by the n-RAG engine 209, the plurality of linked vector embeddings in the one or more data sources in an arrangement based on predefined relationships between each two of the corresponding plurality of user roles, at step 405.

The process 400 may include extracting, by the n-RAG engine 209, the contextual information from one or more data sources, at step 406. The one or more data sources may include the plurality of vector embeddings corresponding to the plurality of user roles. It should be noted that the contextual information may be based on a linked vector embedding from the plurality of linked vector embeddings. It should also be noted that the contextual information may include information associated with the user role stored in one or more linked vector embeddings of the plurality of linked vector embeddings.

For example, the source data may include user role data corresponding to the user roles of a junior associate and a manager. The n-RAG engine 209 may generate one or more data chunks from the user role data and then convert the one or more data chunks into a plurality of vector embeddings. The plurality of vector embeddings include data for user roles of junior associates and managers. The n-RAG engine 209 may then associate the plurality of vector embeddings with the one or more data chunks related to the user role of junior associates to obtain a plurality of linked vector embeddings for junior associates. Similarly, the n-RAG engine 209 may obtain a plurality of linked vector embeddings for managers. The n-RAG engine 209 may store the plurality of linked vector embeddings for junior associates and managers in a hierarchical arrangement (i.e., the plurality of linked vector embeddings for junior associates is stored as nested within the plurality of linked vector embeddings for managers).

Figure 5:
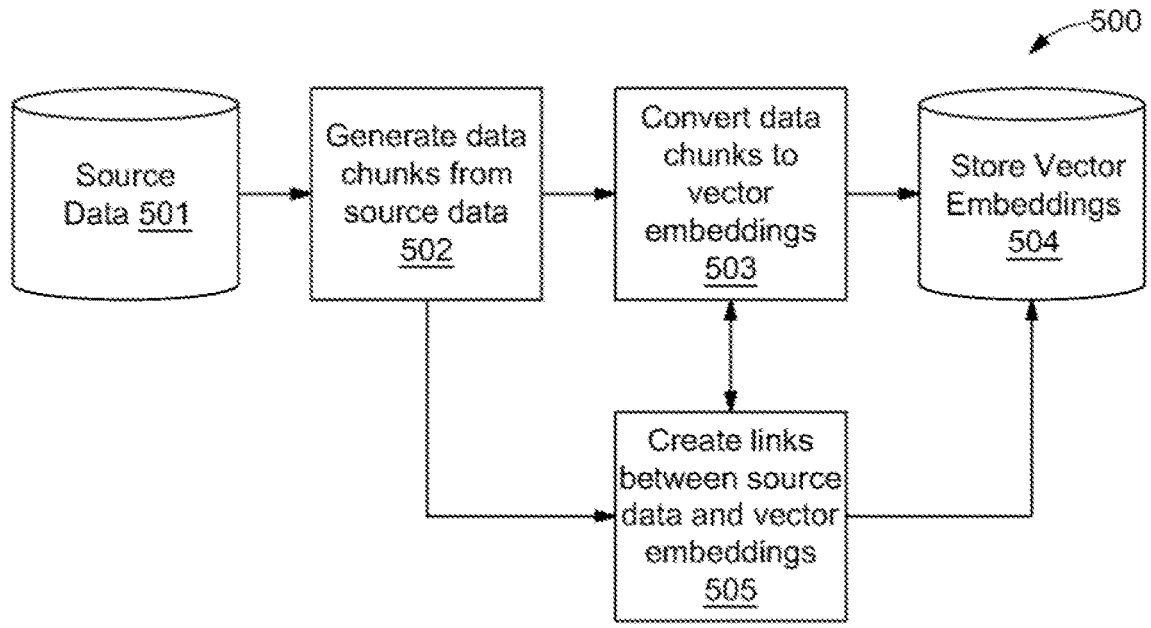
FIG. 5 is a flow diagram of a detailed exemplary process for storing a plurality of vector embeddings in data sources, in accordance with an exemplary embodiment of the present disclosure.

FIG. 5 is a flow diagram that illustrates a detailed exemplary process 500 for storing a plurality of vector embeddings in data sources, in accordance with an exemplary embodiment of the present disclosure. FIG. 5 is explained in conjunction with elements from FIGS. 1, 2, 3 and 4. In an embodiment, the process 500 may be implemented by the computing device 101. The process 500 may include generating, by the n-RAG engine 209, one or more data chunks from the source data 501, at step 502. The source data 501 may include user role data corresponding to the plurality of user roles. The source data 501 may be obtained from the one or more data sources (such as the database 204). The generating of the one or more data chunks from the source data 501 may be performed based on information being covered by the source data 501. The number of the one or more data chunks into which the source data 501 may be split may depend on various sub-domains or various categories of information being covered by the source data 501.

Further, the process 500 may include converting, by the n-RAG engine 209, the one or more data chunks into the plurality of vector embeddings, at step 503. The plurality of vector embeddings may vary from enterprise to enterprise depending on a central field of enterprise activities and hence, various types of roles and designations associated with the enterprise. Further, the process 500 may include storing, by the n-RAG engine 209, the plurality of vector embeddings, at step 504. The plurality of vector embeddings may be stored in the one or more data sources.

In an embodiment, the process 500 may include creating, by the n-RAG engine 209, a plurality of links between the source data 501 and the plurality of vector embeddings, at step 505. This is done by obtaining the one or more data chunks from the step 502 and the plurality of vector embeddings from the step 503. Upon creation of the plurality of links, the plurality of linked vector embeddings may be obtained and stored via the step 504. The plurality of linked vector embeddings may be stored in the one or more data sources in an arrangement based on predefined relationships between the corresponding plurality of user roles. A link may be created such that relevant information from the source data 501 for a particular vector embedding is appropriately covered under a corresponding linked vector embedding. In one non-limiting embodiment, the n-RAG engine 209 may create different links for different nested vector embeddings depending on a type of enterprise and various roles and ranks associated with the enterprise. After creating the appropriate plurality of links, the information is then stored under the associated plurality of vector embeddings which may facilitate more relevant user role-specific response.

Figure 6:
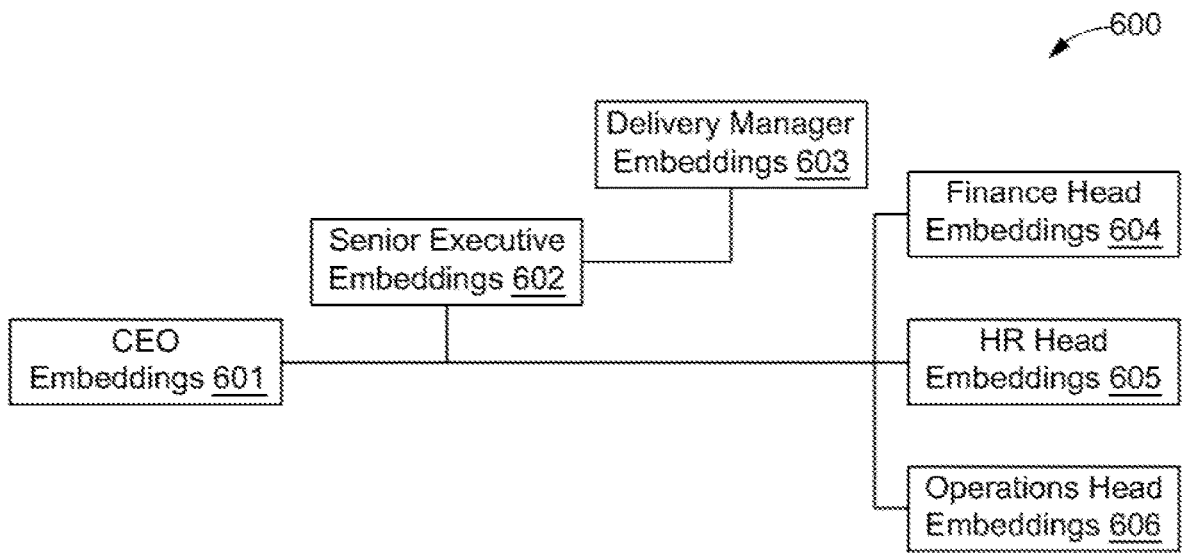
FIG. 6 illustrates an exemplary arrangement of a plurality of vector embeddings in data sources, in accordance with an exemplary embodiment of the present disclosure.

FIG. 6 illustrates an exemplary arrangement 600 of a plurality of vector embeddings in data sources, in accordance with an exemplary embodiment of the present disclosure. FIG. 6 is explained in conjunction with elements from FIGS. 1, 2, 3, 4, and 5.

As per the n-RAG technique, for each of a plurality of user roles, a plurality of linked vector embeddings is created. In other words, for a given user role in the enterprise, a corresponding plurality of linked vector embeddings is created. Further, each user role is associated with remaining of the plurality of user roles via predefined relationships. Thus, the plurality of linked vector embeddings of the user role is also associated with the plurality of linked vector embeddings of each of the remaining of the plurality of user roles based on the predefined relationships. In one non-limiting embodiment of the present disclosure, the predefined relationships between the plurality of linked vector embeddings may be hierarchical, lateral, matrix, and so on. Due to the predefined relationships, the plurality of linked vector embeddings of the user role is nested with a plurality of linked vector embeddings of one or more of the remaining of the plurality of user roles. The nesting of the plurality of linked vector embeddings may facilitate generation of user role-specific customized responses.

The exemplary arrangement 600 is a nested hierarchical arrangement of the plurality of vector embeddings of the plurality of user roles. The exemplary arrangement 600 includes CEO embeddings 601, senior executive embeddings 602, delivery manager embeddings 603, finance head embeddings 604, HR head embeddings 605, and operations head embeddings 606. The plurality of linked vector embeddings is arranged based on predefined relationships between the plurality of user roles. Thus, each of senior executive embeddings 602, delivery manager embeddings 603, finance head embeddings 604, HR head embeddings 605, and operations head embeddings 606 are nested within the CEO embeddings 601. Also, the delivery manager embeddings 603 are nested within the senior executive embeddings 602. The data access control is also assigned based on the predefined relationships. Thus, the user account associated with the CEO may have data access control over user accounts associated with remaining of the plurality of user roles such as senior executive, finance head, HR head, and operations head. The user account associated with senior executive may have data access control over user accounts associated with delivery manager.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
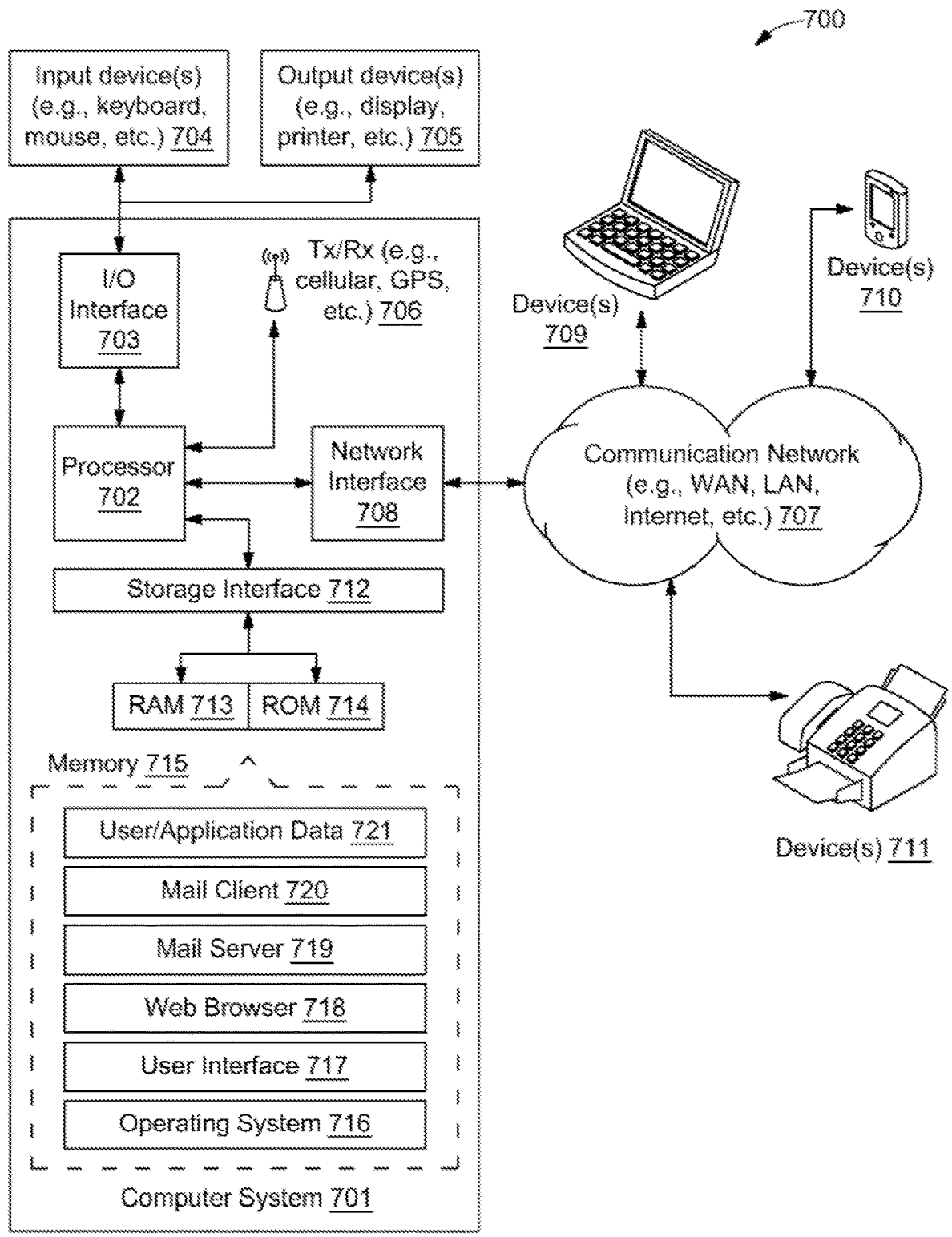
FIG. 7 is a block diagram of a system architecture of a computer system for generating user role-specific responses through LLMs, in accordance with an exemplary embodiment of the present disclosure.

The disclosed methods and systems may be implemented on a conventional or a general-purpose computer system, such as a personal computer (PC) or server computer. FIG. 7 is a block diagram that illustrates a system architecture 700 of a computer system 701 for generating user role-specific responses through LLMs, in accordance with an exemplary embodiment of the present disclosure. Variations of computer system 701 may be used for implementing computing device 101 for calculation of test automation feasibility indices. Computer system 701 may include a central processing unit ("CPU" or "processor") 702. Processor 702 may include at least one data processor for executing program components for executing user-generated or system-generated requests. A user may include a person, a person using a device such as those included in this disclosure, or a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, near field communication (NFC), Fire Wire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver 706 may facilitate various types of wireless transmission or reception. For example, the transceiver 706 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 707 via a network interface 708. The network interface 708 may communicate with the communication network 707. The communication network 707 may be same as the communication network 103, in accordance with some exemplary embodiments of the present disclosure. The network interface 708 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 707 may include, without limitation, a direct interconnection, local area network (LAN), wide area network (WAN), wireless network (e.g., using Wireless Application Protocol), the Internet, etc. Using the network interface 708 and the communication network 707, the computer system 701 may communicate with devices 705, 709, 710, and 711. The devices 705, 709, 710, and 711 may be same as the user device 102a, the user device 102b, ..., and the user device 102n, in accordance with some exemplary embodiments of the present disclosure. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 701 may itself embody one or more of these devices.

In some embodiments, the processor 702 may be disposed in communication with one or more memory devices 715 (e.g., RAM 713, ROM 714, etc.) via a storage interface 712. The storage interface 712 may connect to memory devices 715 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 715 may store a collection of program or database components, including, without limitation, an operating system 716, user interface 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 701 may implement a web browser 718 stored program component. The web browser 718 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 701 may implement a mail server 719 stored program component. The mail server 719 may be an Internet mail server such as MICROSOFT® EXCHANGE®, or the like. The mail server 719 may utilize facilities such as ASP, ActiveX, ANSI C++/C#, MICROSOFT.NET® CGI scripts, JAVA®, JAVASCRIPT®, PERL®, PHP® PYTHON®, WebObjects, etc. The mail server 1119 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 701 may implement a mail client 720 stored program component. The mail client 720 may be a mail viewing application, such as APPLE MAIL®, MICROSOFT ENTOURAGE®, MICROSOFT OUTLOOK®, MOZILLA THUNDERBIRD®, etc.

In some embodiments, computer system 701 may store user/application data 721, such as the data, variables, records, etc. (e.g., user role data, contextual information, vector embeddings, LLM data (attention weights, embedding vectors, training data, etc.), and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of generating user role-specific responses through LLMs. State of art LLMs generate generic responses to users. So, two users of an organization with different roles and possibly, different requirements, may obtain the same response when the users provide same user queries. The disclosed method and system generate user role-specific responses through LLMs. The method and system facilitate generation of more relevant and context-aware responses, thus enabling enforcement of organization-wide common generative AI-based chatbots. The method and system also ensure that the LLMs do not provide any information to a user falling under a given user role for which such information is confidential, irrelevant, or inappropriate. The method and system may further efficiently categorize data into a plurality of vector embeddings based on pre-defined relationships between the plurality of vector embeddings.

As will be appreciated by those skilled in the art, the techniques described in the various embodiments discussed above are not routine, or conventional, or well understood in the art. The techniques discussed above provide for generating user role-specific responses through LLMs. The techniques combine, based on the user role, the user query with contextual information corresponding to the user query to obtain a combined query. The contextual information is retrieved from a plurality of vector embeddings corresponding to the user role. The techniques further generate a user role-specific response corresponding to the combined query through the LLM. Since the combined query includes contextual information specific to the user role, the response generated by the LLM is also more specific to the user role.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for generating user role-specific responses through LLMs. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating user role-specific responses through Large Language Models (LLMs), the method comprising:
receiving, by a computing device, source data comprising user role data corresponding to a plurality of user roles from one or more data sources;
generating, by the computing device, one or more data chunks from the user role data;
transforming, by the computing device, the one or more data chunks into a plurality of vector embeddings;
for each user role of a plurality of user roles, associating, by the computing device, one or more vector embeddings of the plurality of vector embeddings with other vector embeddings of the plurality of vector embeddings to obtain a plurality of linked vector embeddings, wherein the one or more vector embeddings are associated with the other vector embeddings using a plurality of links, and wherein the association is based on the user role;
receiving, by the computing device, a user query from a user account, wherein the user account is associated with the user role from the plurality of user roles;
based on the user role, combining, by the computing device, the user query with contextual information corresponding to the user query to obtain a combined query, wherein the contextual information is based on one or more linked vector embeddings from the plurality of linked vector embeddings;
inputting, by the computing device, the combined query to an LLM;
generating, by the computing device, a user role-specific response corresponding to the combined query through the LLM; and
rendering, by the computing device, the user role-specific response to a display of a user device associated with the user account.

2. The method of claim 1, further comprising extracting, by the computing device, the user role from data associated with the user account.

3. The method of claim 1, further comprising receiving, by the computing device, the user role as an input from the user device.

4. The method of claim 1, further comprising assigning, by the computing device, data access control to the user account based on the user role, wherein the data access control is based on a relationship of the user role with remaining of the plurality of user roles.

5. The method of claim 1, further comprising extracting, by the computing device, the contextual information from the one or more data sources, wherein the one or more data sources comprise the plurality of vector embeddings corresponding to the plurality of user roles.

6. The method of claim 1, further comprising storing, by the computing device, the plurality of linked vector embeddings in the one or more data sources in an arrangement based on predefined relationships between the corresponding plurality of user roles.

7. The method of claim 6, wherein the contextual information comprises information associated with the user role stored in the one or more linked vector embeddings of the plurality of linked vector embeddings.

8. A system for generating user role-specific responses through Large Language Models (LLMs), the system comprising:
a processing circuitry; and
a memory communicatively coupled to the processing circuitry, wherein the memory stores instructions, which when executed by the processing circuitry, cause the processing circuitry to:
receive source data comprising user role data corresponding to a plurality of user roles from one or more data sources;
generate one or more data chunks from the user role data;
transform the one or more data chunks into a plurality of vector embeddings;
for each user role of a plurality of user roles, associate one or more vector embeddings of the plurality of vector embeddings with other vector embeddings of the plurality of vector embeddings to obtain a plurality of linked vector embeddings, wherein the one or more vector embeddings are associated with the other vector embeddings using a plurality of links, and wherein the association is based on the user role;
receive a user query from a user account, wherein the user account is associated with the user role from the plurality of user roles;
combine, based on the user role, the user query with contextual information corresponding to the user query to obtain a combined query, wherein the contextual information is based on one or more linked vector embeddings from the plurality of linked vector embeddings;
input the combined query to an LLM;
generate a user role-specific response corresponding to the combined query through the LLM; and
render the user role-specific response to a display of a user device associated with the user account.

9. The system of claim 8, wherein the processor instructions, on execution, further cause the processing circuitry to extract the user role from data associated with the user account.

10. The system of claim 8, wherein the instructions, on execution, further cause the processing circuitry to receive the user role as an input from the user device.

11. The system of claim 8, wherein the instructions, on execution, further cause the processing circuitry to assign data access control to the user account based on the user role, wherein the data access control is based on a relationship of the user role with remaining of the plurality of user roles.

12. The system of claim 8, wherein the instructions, on execution, further cause the processing circuitry to extract the contextual information from the one or more data sources, wherein the one or more data sources comprise the plurality of vector embeddings corresponding to the plurality of user roles.

13. The system of claim 8, wherein the instructions, on execution, further cause the processing circuitry to store the plurality of linked vector embeddings in the one or more data sources in an arrangement based on predefined relationships between the corresponding plurality of user roles.

14. The system of claim 13, wherein the contextual information comprises information associated with the user role stored in the one or more linked vector embeddings of the plurality of linked vector embeddings.

15. A non-transitory computer-readable medium storing computer executable instructions for generating user role-specific responses through Large Language Models (LLMs), the computer-executable instructions configured for:
receiving source data comprising user role data corresponding to a plurality of user roles from one or more data sources;

generating one or more data chunks from the user role data;

transforming the one or more data chunks into a plurality of vector embeddings;

for each user role of a plurality of user roles, associating one or more vector embeddings of the plurality of vector embeddings with other vector embeddings of the plurality of vector embeddings to obtain a plurality of linked vector embeddings, wherein the one or more vector embeddings are associated with the other vector embeddings using a plurality of links, and wherein the association is based on the user role;

receiving the user query from a user account, wherein the user account is associated with the user role from the plurality of user roles;

combining, based on the user role, the user query with contextual information corresponding to the user query to obtain a combined query, wherein the contextual information is based on one or more linked vector embeddings from the plurality of linked vector embeddings;

input the combined query to an LLM;

generate a user role-specific response corresponding to the combined query through the LLM; and render the user role-specific response to a display of a user device associated with the user account.

16. The non-transitory computer-readable medium of claim 15, wherein the computer-executable instructions are further configured for extracting the user role from data associated with the user account.

17. The non-transitory computer-readable medium of claim 15, wherein the computer-executable instructions are further configured for receiving the user role as an input from the user device.

18. The non-transitory computer-readable medium of claim 15, wherein the computer-executable instructions are further configured for assigning data access control to the user account based on the user role, wherein the data access control is based on a relationship of the user role with remaining of the plurality of user roles.

* * * * *